R. CURRY.
RESILIENT TIRE.
APPLICATION FILED JULY 9, 1921.
1,421,917.
Patented July 4, 1922.
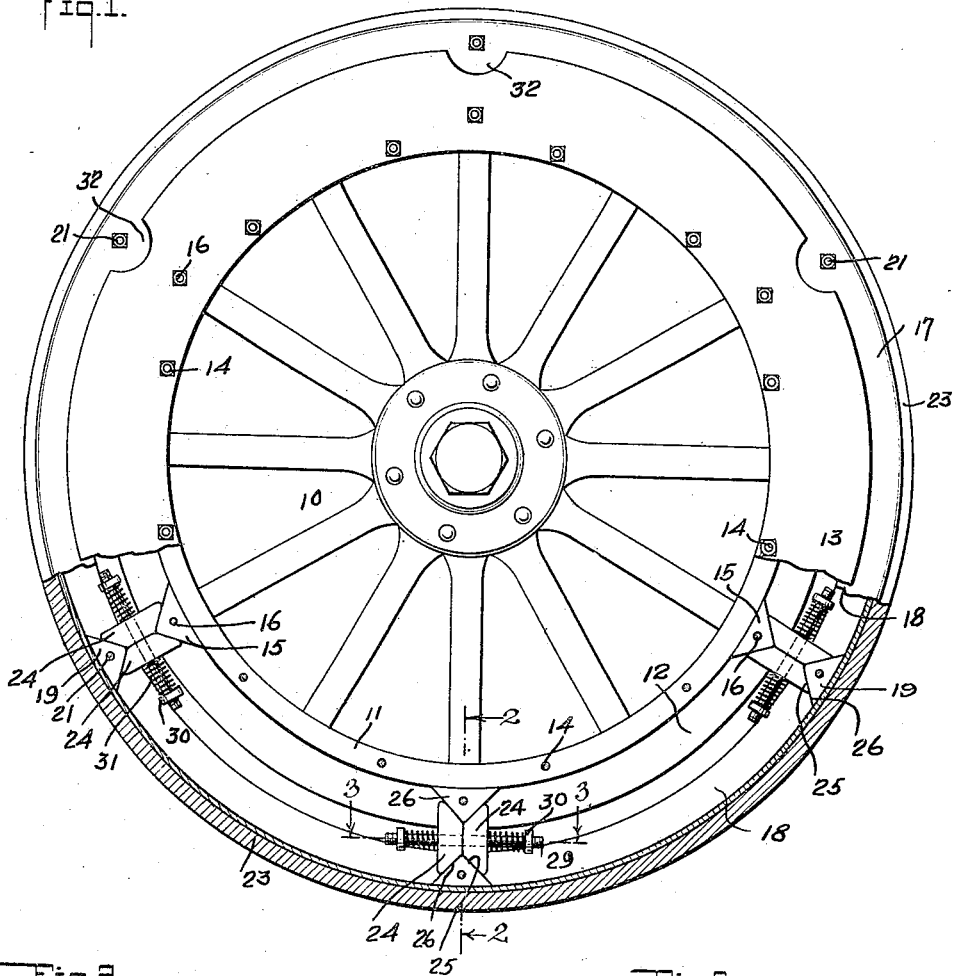
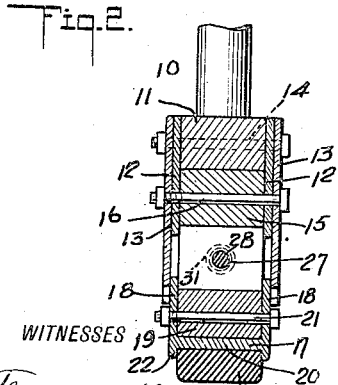
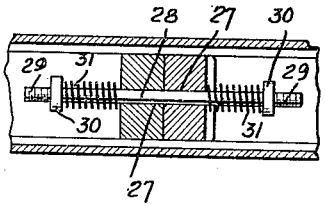
WITNESSES
Frederick Diehl.
Hugh H. Ott
INVENTOR
R. CURRY
BY
ATTORNEYS

UNITED STATES PATENT OFFICE.

ROBERT CURRY, OF NEW YORK, N. Y.

RESILIENT TIRE.

1,421,917.    Specification of Letters Patent.    Patented July 4, 1922.

Application filed July 9, 1921. Serial No. 483,633.

*To all whom it may concern:*

Be it known that I, ROBERT CURRY, a citizen of the United States, and a resident of the city of New York, borough of the Bronx, in the county of Bronx and State of New York, have invented a new and Improved Resilient Tire, of which the following is a full, clear, and exact description.

This invention relates to tires and refers more particularly to non-pneumatic resilient tires for vehicle wheels, the same being in the nature of an improvement over a similar device upon which Letters Patent of the United States No. 1,083,059, were granted on December 30, 1913.

Broadly, the invention contemplates a non-pneumatic resilient tire which affords the same cushioning effect as a pneumatic tire, but which eliminates the objections thereto due to punctures, blow-outs, or the like.

Specifically, the present invention aims for one of its objects to materially simplify the structure and reduce the cost of production relative to the prior patent, without detracting in any way from its efficiency and durability.

With these and other objects in view the invention resides in the novel construction, combination and arrangements of parts set forth in the following specification, pointed out in the appended claims and illustrated in the accompanying drawing, it being understood that the right is reserved to embodiments other than those actually illustrated herein to the full extent indicated by the general meaning of the terms in which the claims are expressed and by variations in the phraseology of the same.

In the drawing—

Figure 1 is a side elevation of a wheel equipped with a tire constructed in accordance with the invention, parts being broken away and shown in section to disclose the underlying structure.

Fig. 2 is a fragmentary sectional view taken approximately on the line 2—2 of Fig. 1.

Fig. 3 is a similar view taken approximately on the line 3—3 of Fig. 1.

In the drawing 10 designates a wheel of any suitable construction provided with a felly 11. The tire includes a pair of annular inner and outer plates 12 and 13 respectively secured to the opposite sides of the felly by means of the transverse securing bolts 14 which pass through aligned apertures in the plates and the felly. The inner plates 12 are of a lesser width than the outer plates 13 whereby the outer peripheral edges of the plates 13 project an appreciable distance beyond the outer peripheral edges of the plates 12. A plurality of equi-distantly spaced wedge blocks 15 are secured between the plates 12 with their inner faces abutting the outer periphery of the felly and their outer ends projecting radially therefrom, transverse securing bolts 16 being employed for the purpose, said bolts passing through aligned apertures in the wedge blocks 15 and the inner and outer plates 12 and 13. An outer rim member 17 of substantially H-shape in cross section is provided and the inner side flanges 18 thereof are received between the outer plates 13. A plurality of equi-distantly spaced wedge blocks 19 are secured between the flanges 18 with their inner faces in abutment with the inner periphery of the web 20 of the rim 17. The wedge blocks 19 carried by the rim 17 coincide in their position with the wedge blocks 15 whereby the pointed extremities thereof are opposed to each other. The wedge blocks 19 are secured in place by means of the securing bolts 21 which pass transversely through aligned apertures in the wedge blocks and the flanges 18. The outwardly projecting beads 22 of the rim 17 are designed to receive therebetween an annular tread member 23 preferably of rubber. The outer rim is designed for relative movements with respect to the inner member of the tire and in order to provide means for cushioning said movements to absorb the shock, a pair of opposed relatively separable beveled blocks 24 are interposed between each pair of wedge blocks 15 and 19, the beveled faces 25 of said blocks coacting with the beveled faces 26 of the wedge blocks.

The beveled blocks 24 are provided with longitudinally aligned apertures 27 through which a rod 28 passes, the opposite extremities thereof being threaded as at 29 to receive an interiorly threaded abutment 30 for adjustably mounting the same thereon. Coiled expansion springs 31 surround the rod 28 and are interposed respectively between each beveled block 24 and abutment 30 to normally effect relative movement of said blocks toward each other whereby normal separation of the wedge blocks 15 and 19 are effected through the interengagement of the beveled faces 25 of the beveled blocks and 26 of the wedge blocks. The beveled blocks 24 are of a width corresponding to the distance between the flanges 18 and inner plates 12 whereby the same are guided in their movements. The outer peripheral edges of the outer plates 13 are cut away as at 32 to compensate for the relative movement of the outer rim member 17.

In operation, the weight of the body of the vehicle is resiliently supported on the springs 31 due to the tendency of the lowermost inner wedge blocks 15 to force the beveled blocks 24 apart against the tension and expansive action of the springs 31 and the uppermost outer wedge blocks 19 to function similarly due to the eccentric movements of the felly with respect to the outer rim member upon rotation of the wheel. The coinciding wedge blocks between the upper and lowermost ones will move respectively upward and downward and effect relative separation of the beveled blocks as will be clearly understood by reference to Fig. 1 of the drawing. By rotating the abutments 30, to move the same nearer to or further away from the beveled blocks, the tension of the springs 31 may be varied to increase or decrease the resistance of the same and the resiliency of the tire. When the beveled faces of the wedge blocks and beveled blocks become worn the same may be replaced by merely removing the securing bolts 16 and 21 and removing the abutments and springs 30 and 31.

Having thus described my invention, what I claim is:

1. A resilient tire for vehicle wheels comprising inner and outer rim members, a plurality of spaced pairs of wedge blocks provided respectively on said rim members, and complementary pairs of beveled blocks tensioned against relative separation and coacting with each pair of wedge blocks for resisting the relative movements of the rim members.

2. A resilient tire for vehicle wheels including a pair of rims, one disposed within and spaced from the other, and means for resisting relative radial movements of said rims comprising circumferentially spaced pairs of blocks tensioned against relative separation, and complementary pairs of blocks provided respectively on said rims adapted to coact with the first mentioned blocks upon relative radial movements of the rims to effect their separation.

3. A resilient tire for vehicle wheels including a pair of rims, one disposed within and spaced from the other, and means for resisting relative radial movements of said rims comprising circumferentially spaced pairs of beveled blocks, means for tensioning the same against relative separation, and complementary pairs of wedge blocks on said pair carried respectively by the rims and adapted to coact with the beveled blocks upon relative movement of said rims to effect separation of the same.

4. In a resilient tire for vehicle wheels, the combination with the felly of a wheel, of a rim spaced therefrom and means for resisting relative radial movements of the same with respect to the felly comprising circumferentially spaced pairs of opposed wedge blocks secured respectively to the felly and said rim, and pairs of beveled blocks tensioned against relative separation, all of said blocks having complementary beveled faces adapted to coact upon relative radial movements of the rim and felly whereby to cause relative separation of the beveled blocks.

5. A device as set forth in claim 3, in which the rims are provided with guard flanges at their opposite sides and in which the guard flanges of one rim are slidable between the guard flanges of the other rim whereby the outer rim and the beveled blocks are maintained against lateral displacement.

6. A resilient tire for vehicle wheels embodying spaced inner and outer rims, a series of radially disposed cams provided on said rims, a series of circumferentially movable cams respectively engaging the rim cams, and means for resiliently resisting circumferential movement of the circumferentially movable cams whereby to tension the relative movement between said rims.

7. The combination with a vehicle wheel of a resilient non-pneumatic tire embodying a tread rim spaced from the wheel felly, a radially disposed series of cams provided respectively on the tread, rim and felly, a series of complementary circumferentially movable cams engaging the first mentioned cams, and means for resiliently resisting the circumferential movement of said latter cams whereby to tension relative movement between the tread, rim and felly.

ROBERT CURRY.